(12) United States Patent
Taylor et al.

(10) Patent No.: US 7,664,992 B2
(45) Date of Patent: Feb. 16, 2010

(54) SUPERCOMPUTING

(75) Inventors: Richard Taylor, Bristol (GB); Christopher Tofts, Bristol (GB); John William Lumley, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

(21) Appl. No.: 11/260,088

(22) Filed: Oct. 28, 2005

(65) Prior Publication Data
US 2006/0107110 A1    May 18, 2006

(30) Foreign Application Priority Data
Oct. 29, 2004    (GB)  ................................. 0424125.3

(51) Int. Cl.
G06F 11/00    (2006.01)
(52) U.S. Cl. ....................................................... 714/43
(58) Field of Classification Search ...................... 718/1, 718/100; 714/43
See application file for complete search history.

(56) References Cited

U.S. PATENT DOCUMENTS

| | | | |
|---|---|---|---|
| 4,819,232 A | | 4/1989 | Krings |
| 5,784,616 A | * | 7/1998 | Horvitz ...................... 718/102 |
| 6,334,196 B1 | * | 12/2001 | Smorodinsky et al. ......... 714/37 |
| 6,374,286 B1 | * | 4/2002 | Gee et al. .................... 718/108 |
| 6,560,717 B1 | | 5/2003 | Scott et al. |
| 6,598,184 B1 | | 7/2003 | Merget et al. |
| 6,611,729 B1 | | 8/2003 | Drum |
| 6,816,813 B2 | | 11/2004 | Tan et al. |
| 6,934,673 B2 | | 8/2005 | Alvarez et al. |
| 7,043,728 B1 | * | 5/2006 | Galpin ....................... 718/102 |
| 7,058,010 B2 | * | 6/2006 | Chidambaran et al. ...... 370/218 |
| 7,100,070 B2 | * | 8/2006 | Iwamura et al. ................ 714/4 |
| 7,103,809 B2 | | 9/2006 | Schlangen |
| 7,142,505 B2 | | 11/2006 | Chaudhuri |
| 7,305,675 B1 | * | 12/2007 | Gulick ........................ 718/102 |
| 7,437,730 B2 | * | 10/2008 | Goyal ......................... 718/105 |
| 2002/0078232 A1 | * | 6/2002 | Simpson et al. ............. 709/238 |

(Continued)

FOREIGN PATENT DOCUMENTS

EP    0 987 630 A2    3/2000

(Continued)

OTHER PUBLICATIONS

Peercy et al; "Software Schemes of Reconfigurations and Recovery in Distributed Memory Multicomputers Using the Action Model"; 25th International Symposium on Fault-Tolerant Computing, 1995; pp. 479-488.

(Continued)

Primary Examiner—Robert Beausoliel
Assistant Examiner—Amine Riad

(57) ABSTRACT

A method of operating a supercomputer having a plurality of computing elements each connected to a fast communications link is disclosed, the method comprising the steps of: scheduling specified elements to perform computing tasks in specified cycles of a computing operation; in the event of failure of a fast communications link in a given cycle, transferring state from a disabled element no longer able to communicate as a result of the failure to an idle element not scheduled to perform a task in the given cycle; operating the idle element to perform any uncompleted tasks scheduled for the disabled element remaining in the cycle.

9 Claims, 5 Drawing Sheets

U.S. PATENT DOCUMENTS

| | | | |
|---|---|---|---|
| 2003/0009603 A1* | 1/2003 | Ruths et al. | 709/318 |
| 2004/0123179 A1 | 6/2004 | Dragomir-Daescu et al. | |
| 2004/0210898 A1 | 10/2004 | Bergen et al. | |
| 2005/0268300 A1* | 12/2005 | Lamb et al. | 718/100 |
| 2006/0136772 A1 | 6/2006 | Guimbellot et al. | |

FOREIGN PATENT DOCUMENTS

| | | |
|---|---|---|
| GB | 2 392 520 A | 3/2004 |
| JP | 07-282022 | 10/1995 |

OTHER PUBLICATIONS

Dutts et al; "Some Practical Issues in the Design of Fault-Tolerant Multiprocessors"; Proceedings of the International Symposium on Fault Tolerant Computing; Jun. 1991; pp. 292-299.

Alvarez, Guillermo et al., "Efficient Verification of Performability Guarantees", Published in the Fifth International Workshop on Performability Modeling of Computer and Communication Systems (PMCCS-5), Sep. 15-16, 2001, Erlangen, Germany, pp. 1-7.

Feng et al., "The Bladed Beowulf: A Cost-Effective Alternative to Traditional Beowulfs", Proceedings of the IEEE International Conference on Cluster Computing, 2002, pp. 1-10.

Oliner, A.J. et al., "Probabilistic QoS Guarantees for Supercomputing Systems", Proceedings of the 2005 International Conference on Dependable Systems and Networks (DSN 05) 2005, IEEE, pp. 1-10.

Oliner, A.J. et al., "Fault-Aware Job Scheduling for BlueGene/L Systems" 2004, IEEE, pp. 1-10.

Raghavendra et al., "Reliability in Distributed Systems", IEEE Transactions on Computers, vol. 37, No. 3, Mar. 1988, pp. 352-358.

Ryan et al., "The Blue Mountain Supercomputer Technical Background" Lambda, Jun. 1, 2001, pp. 4-24 and Annex A and B.

Saradhi et al., "Dynamic Establishment of Differentiated Survivable Lightpaths in WDM mesh Networks"; Computer Communications, Eslevier Science Publishers BV, Amsterdam, NL Feb. 15, 2004; ISSN 0140-3664, Computer Communications, vol. 27, pp. 273-294.

* cited by examiner

| A | Compute | 1 |
| A | Transmit to B | 1 |
| B | Compute | 1 |
| B | Transmit to C | 1 |
| C | Compute | 1 |
| C | Transmit to D | 1 |
| D | Compute | 1 |
| D | Transmit to A | 1 |
| Total | | 8 |

| A | Compute | 1 |
| A | Transmit to B | 1 |
| B | Compute | 1 |
| B | Transmit to C | 1 |
| C | Compute | 1 |
| C | Transmit to E | 2 |
| E | Compute | 1 |
| E | Transmit to A | 2 |
| Total | | 10 |

| CYCLE | A | B | C | D | E |
|---|---|---|---|---|---|
| 1 | S | S | C | S | S |
| 2 | S | S | C | S | S |
| 3 | S | B | C | S | S |
| 4 | S | S | C | D | S |
| 5 | S | B | C | D | S |
| 6 | A | B | C | D | E |
| 7 | A | B | C | D | E |
| 8 | S | S | C | S | S |

Fig. 7

| CYCLE | A | B | C | D | E |
|---|---|---|---|---|---|
| 1 | A1 \| S1 | S | C | S | S |
| 2 | A1 \| S1 | S | C | S | S |
| 3 | A1 \| S1 | B | C | S | S |
| 4 | A1 \| S1 | S | C | D | S |
| 5 | A1 \| S1 | B | C | D | S |
| 6 | A1 \| S1 | B | C | D | E |
| 7 | A1 \| S1 | B | C | D | E |
| 8 | A1 \| S1 | S | C | S | S |

Fig. 8

SUPERCOMPUTING

FIELD OF THE INVENTION

The present invention relates to computer systems, and in particular to computer systems having a plurality of computing elements, each connected to a communication link.

BACKGROUND OF THE INVENTION

So-called supercomputers share many characteristics with so-called ordinary computers, in that they comprise processing, memory, storage and communications elements. At this level of abstraction, supercomputers differ only in scale. One significant qualitative difference, however, lies in that, in the case of a supercomputer, the ratio of meaningful processing operations (one example of which is a floating point operation) to communication operations approaches unity, whereas in the case of, for example, a desktop PC, the ratio is usually at least as large as 64:1. It follows that the speed of the communications links can severely limit the speed of operation of a supercomputer and that, accordingly, supercomputers require extremely fast communication links between different processing nodes. Currently, fast communications links for supercomputers have relatively poor reliability and are the most frequent cause of failure. This is partly a direct consequence of the relatively low numbers in which they are manufactured (in turn consequent upon the relative rarity of supercomputers). The provision of redundant fast communications links to ameliorate unreliability is not preferred because, for a given processing node and communication link pairing of a supercomputer, the fast communication link constitutes a significant proportion of the cost.

BRIEF DESCRIPTION OF THE DRAWINGS

Embodiments of the present invention will now be described, by way of example, and with reference to the accompanying drawings, in which:

FIGS. 7 and 8 are schematic illustration of the consumption of computing power and allocation of spare elements during the course of a multi-cycle computing operation.

DETAILED DESCRIPTION OF THE DRAWINGS

Figure 1:
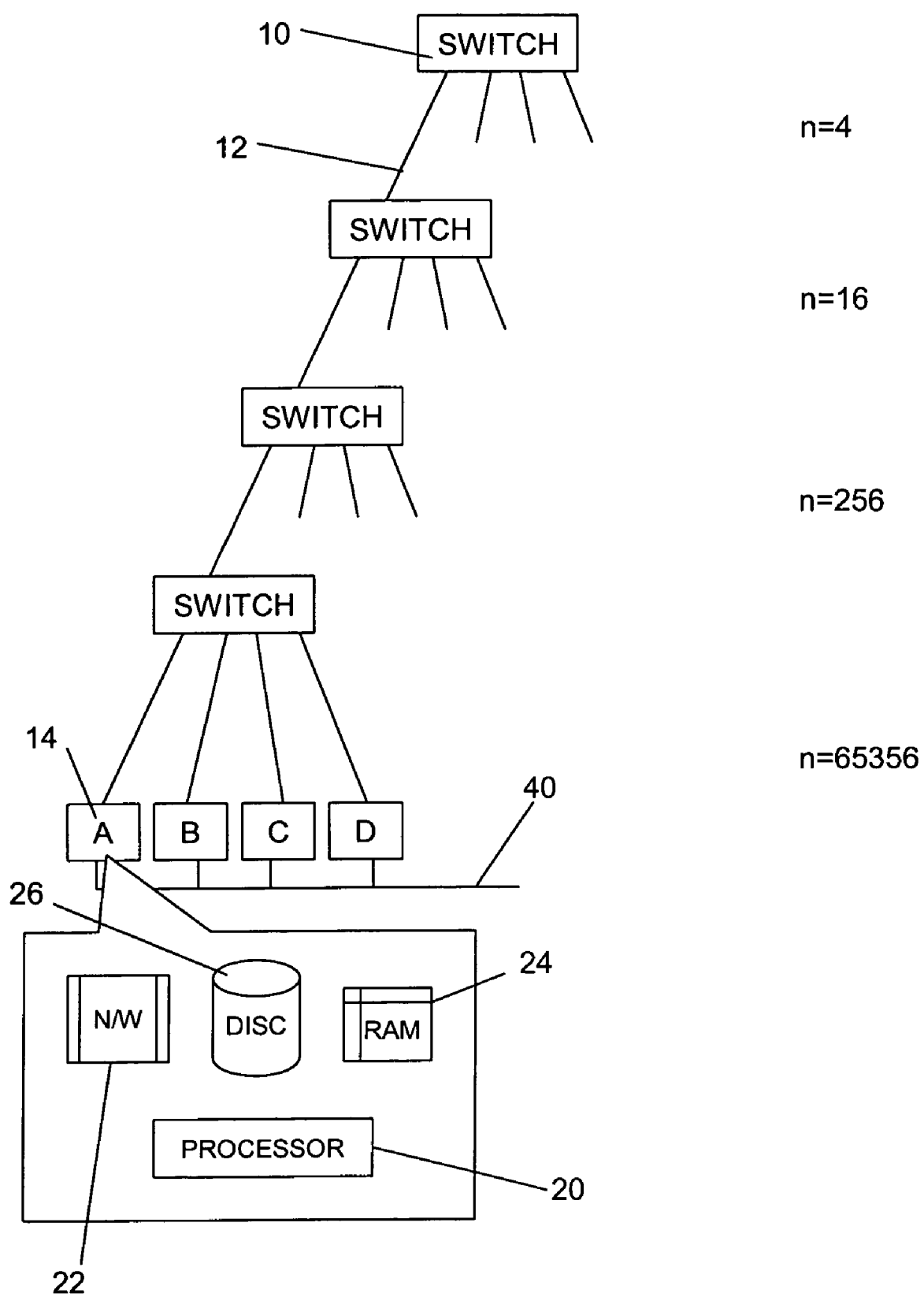
FIG. 1 is a schematic illustration of part of the architecture of a supercomputer.

Referring now to FIG. 1, the architecture of a typical supercomputer is illustrated and has the form of a plurality of switches 10 located at the nodes of a hierarchical tree and interconnected by fast communications links 12. The heirarchical tree structure results in a the creation of a plurality of 'leaf' nodes at its base, which are, in the present example, each populated by computing elements 14. In the illustrated hierarchy, each node has a single parent node (i.e. a node to which it is connected in the next level up in the hiearchy) and four child nodes (nodes in the next level down in the hiearchy), so that a level n in the hiearchy of the tree generates $2^n$ nodes. The single switch 10A which is the origin node has four child nodes, which form the second level of the hiearchy; each of these, in turn have four child nodes, giving rise, in turn to sixteen child nodes at the third level ($2^3$) and 256 nodes at the fourth level, which generates 65536 leaf nodes, and thus 65536 computing elements, at the fifth level of the hierarchy. Additionally, each of the computing elements is usually connected to a slow communications link, such as a local area network. (LAN) 40.

It is apparent from the architecture above that, in order for any computing element to communicate with any other element, it is necessary to perform a minimum communications path of a single 'hop', that is to say a communications path through a single switch 10, and a maximum of four hops. Because, in a supercomputer, the ratio of meaningful compute operations to communications operations is significantly lower than in an ordinary computer, it is apparent that the speed of the fast communications links plays a significant role in determining the speed of the supercomputer overall. Accordingly, the fast communications links must be capable of providing low-latency, high bandwidth communications. Such links are known per se, and one example of such links are provided by a company called Quadrics.

Presently supercomputers have two principal failure modes. The most probable failure mode of a supercomputer is failure of a fast communications link; more particularly such a failure will typically occur in the network card 22 (which may properly be thought of as part of the communications link) or in the corresponding hardware at a switch 10. Given the relatively low ratio of compute to communication cycles, such failures inevitably cause interruption to a computing operation. The second, less frequent failure mode is failure of a computing element, and, consequently, loss of data already computed. These two failure modes can, on occasions be interactive, in that a failure in a fast communications link can then instigate a failure of a computing element. This can, in extremely rare circumstances, be caused by a short in the fast comms hardware resulting in physical failure of the computing element hardware. More probably, a fast comms failure instigating a failure of a computing element will occur as a result of software error, typically caused when interruption of transmission of a data packet causes a program to hang.

To obviate such an event, current practice is to back up data from each computing element at regular intervals which are shorter than the mean time between failure of a fast communications link 12. Upon failure of a link, operation of the supercomputer is interrupted; on failure of an element the data in all affected computing elements is then restored to the state at the time of the previous back-up operation. This results in a delay, firstly to restore the data, and then to perform, once again, those computations which had previously been performed in any time interval between the most recent back up and the time of failure. Moreover, even in the absence of any failure, the back-up operation for each computing element is a significant temporal overhead. Greater reliability in the fast communications links would, therefore, lead to improved performance of a supercomputer in which they are used. Unfortunately, due, in part, to their relatively low volume of manufacture, the relatively low reliability of fast communications links is, at present, innate, while their relatively high cost renders impractical attempts to increase reliability by the provision of substantial (i.e. sufficient to have a significant affect on reliability) redundant links.

An inventive aspect of the present embodiment lies in an appreciation of cost-effective improvements which can be made to the reliability of a supercomputer and which are predicated upon the low reliability of fast communications links. A significant part of the cost of a supercomputer lies in the cost of the computing elements. It is nonetheless possible, for only a modest increase in that cost, to improve the reliability of these elements to the extent that they can be considered statistically 'robust', meaning that any unreliability of the kind which is apt to cause loss of data can be discounted over the duration of a typical supercomputing operation. Once all of the computing elements have acquired such robustness, it can be an axiom of operation of the supercomputer that data backup to protect any state stored in any computing element is unnecessary. From this it follows that, even in the absence of any backup procedure, failure of a fast communications link will then only result in a suspension of computing activity and that any remedial or protective procedure then only has the function of addressing potential failure in a fast communication link, rather than of protecting against lost computing state.

Referring once again to FIG. 1, each computing element typically comprises a processor 20, a network card 22 to enable communication via the fast network link 12 and storage, which in the present example includes both addressable memory 24 and optical, or magnetic disc storage 26. However, for reasons which will be amplified later, in order to be considered robust in the present context, a computing element merely needs to be able to preserve its state, and in order to preserve its state, it must merely have, at all times during a computing operation, sufficient processing and storage capability to write and read data to and from storage. Thus, in the present context it is possible that, during the course of a computing operation, a element may lose the ability to continue performing any computations due to a fault in its processing capability and/or storage capability, but that, provided it retains, in spite of the or each such fault, the ability to write its existing state to storage, and retrieve existing state from storage, it is considered robust.

Figure 2A:
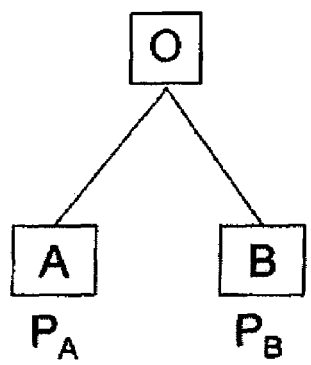
FIG. 2 is a schematic illustration of a model of a sub-component group of a computing element in FIG. 1.
Figure 2B:
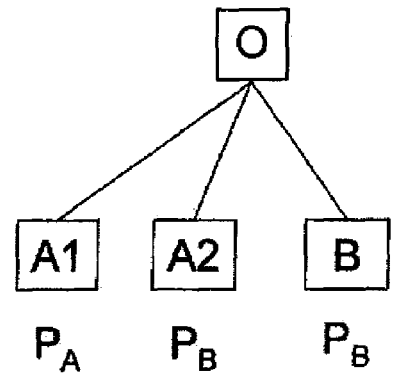
Figure 3:
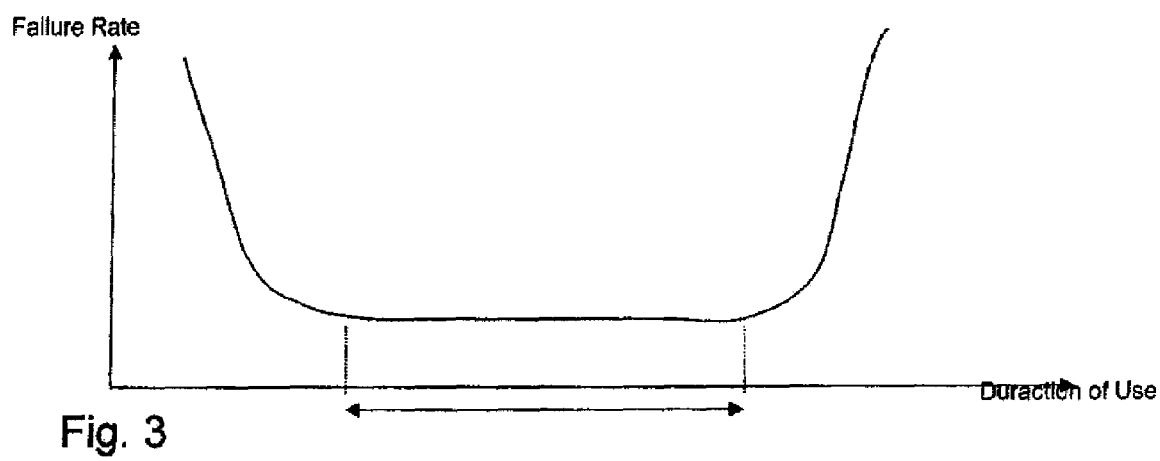
FIG. 3 is a graph of failure rate against duration of use for components in FIG. 2.

Referring now to FIG. 2A, two elements A and B of a computing element are illustrated conceptually as linked together at a node O. A and B can, respectively, be thought of as sufficient processing capability to write and read date to and from storage, and sufficient storage capability to store data written and enable stored data to be read. In other words elements A and B represent the irreducible core functionality which must endure in order to render any processing element robust. Accordingly it follows that, at node O, both A and B must be functioning for the sub-group to be functioning. The probability of element A functioning over a predetermined period of time is PA and the probability of element B functioning over that same period is PB; the 'reliability' of the sub-group, i.e. the probability of it functioning is therefore simply $P_A P_B$. Typically, in such a combination of elements, one has a reliability (probability of functioning) substantially higher than the other (for example, in a processor-storage combination the processor is typically substantially more reliable). The easiest way to increase the reliability of this sub-group, therefore, is to increase the reliability of the least reliable component. Reliability can typically be increased in one of two ways. Firstly, referring to FIG. 2B, element A can be redundantly provided; the probability of failure thus being then that BOTH of the redundantly provided elements fail; i.e. the reliability is then $(P_{A1}+P_{A2})P_B$. Alternatively, intrinsically more reliable components may be used. FIG. 3 shows a graph of failure rate against time, from which it can be seen that, at the initial part of a component's life, there is a high failure rate, after which, there is a substantially constant and very low failure rate; toward the end of its lifetime the failure rate increases once again. The probability value for the reliability of a component thus takes both the initial and end high failure rates into account. But by using components operating only in the zone $R_T$, i.e. components which have undergone initial operation without failure (known in the art as 'burnt-in' components), and decommissioning such components before the failure rate rises toward the end of their lifetime, the reliability of a component can be dramatically improved.

The requisite reliability to be achieved for the seminal processing and storage capability of each computing element is typically obtained by working backwards from a desired level of reliability of each computing element in the supercomputer over a given period of time. In other words, the reliability of each computing element must be sufficiently large that the probability of any single one of N elements in the supercomputer failing during the time of a computing operation is lower than some predetermined figure, known hereinafter as the aggregate probability of failure (aggregate reliability, the inverse of probability of failure, being construed accordingly). Expressed algebraically as follows:

$$\log P < \log S/TN$$

Where

S is the probability of successful running of each of N elements for a time T (i.e. aggregate probability of success), and P is the probability of a single element running for a time T.

A reliability of irreducible core capability for each element of greater than 99.999999% has been found to provide acceptable aggregate reliability for many supercomputing operations.

On its own, however, the provision of computing elements which have a robust state does not ameliorate the problem of interrupted computing operations due to broken fast communications links because, once a fast communications link becomes inoperative, the computing operation must still be interrupted to repair the broken fast comms link, and the time of such an interruption (and thus the time over which the computation is to be interrupted) can be considerable if the link must be replaced.

In accordance with a further embodiment of the present invention, a predetermined number of computing elements are left inoperative at the start of a computing operation. In the event of failure of a fast communication link, the computing element connected to that broken link will not lose its state because it has been configured to have robust state. It's state is therefore transferred to a 'spare' computing element, and the computation continues. Transfer of the state can be made manually, for example simply by the connection by an operator of a USB or firewire cable between the two computing elements. Alternatively, if preferable, the state can be transferred using a Local Area Network (LAN) 40 which is typically provided to link elements, not for the performance of 'supercomputing' operations, but the performance of 'housekeeping' operations (eg upgrade of software etc.), the LAN being considerably more reliable than the fast communications links. Transfer of the state takes only as long as a backup routine, but, in contrast to a backup routine, does not occur ritually and so is not an inevitable and repeated time penalty. In addition it is frequently likely to take less time than is required for restoration of the broken fast communications link—which may now be repaired once the computing operation has resumed. The 'inoperative' computing element may not, in fact, be inoperative during the computing operation, but may merely be engaged in performing a computing operation of lower priority, which can be sacrificed in the event of a failure to a fast communications link which requires commissioning an inoperative element.

The provision of inoperative elements means that, because some computing element are intentionally not commissioned in the performance of the computing operation, when all of the commissioned computing elements are operational, the computing operation will not progress as rapidly as if every computing element had been commissioned because there are fewer commissioned computing elements overall. However, by choosing the number of inoperative elements having regard to the probable number of fast communications links which will fail during the course of the computing operation, it is possible to provide a configuration which, statistically, will conclude the computing operation more rapidly than if all of the computing elements had been commissioned for the calculation from the beginning, because no time is lost in reconstituting a fast communications link.

The proportion of computing elements which are kept inactive for redundant provision is determined as follows. In a network of N computing elements, and for an operation whose expected run time (taking into account probable failures) is T hours, where the probability of survival per hour of a fast communications element is P (the probability that it will run for an hour thus being $P^T$), the probability of a given number of broken communications links is given by the series:

$$B[N, (1-P^T)]$$

If S is the probability of successfully achieving the desired run time, then the number of spare elements M must be chosen such that:

$$B_M[N, (1-P^T)] > S$$

Figure 4:
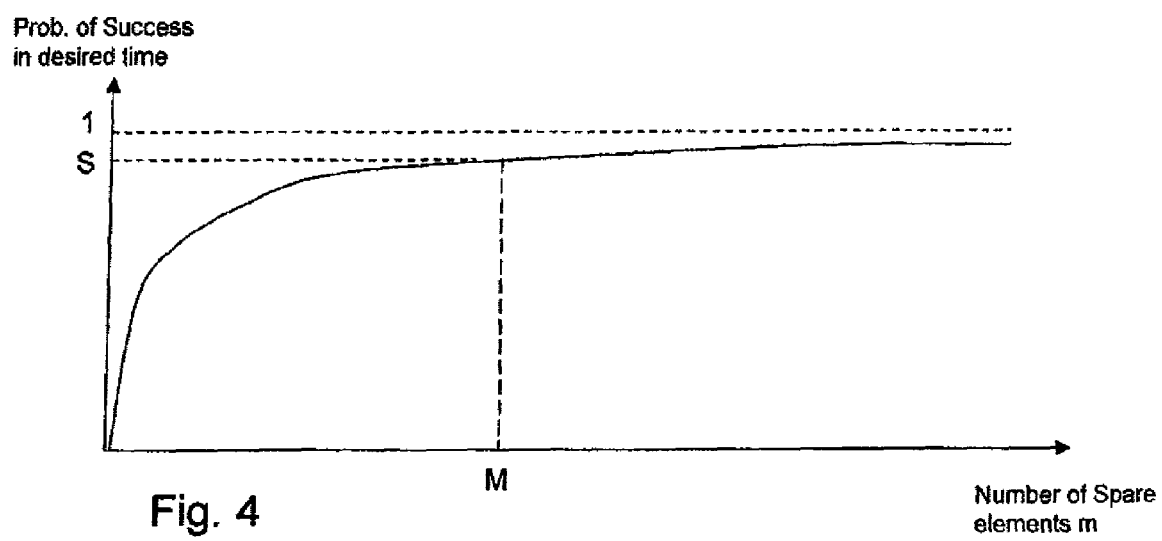
FIG. 4 is a graph of the probability of success of completion of a computing operation within a specified time against variation in a number of spare computing elements provided.

This can be illustrated graphically in FIG. 4, which shows a graph of the probability of successful completion of a computing operation within a specified time period against the number of redundant computing elements m. It can be see that as the number of redundant elements increases, the probability of successful completion within the time allocated approaches unity (but never reaches it). The desired reliability (i.e. probability of successful completion) S is chosen at some predetermined level, and it is this level of probability which determines the minimum number of redundant elements required in order, statistically, to be able to achieve that level of reliability.

Figures 5, 6A, 6B:
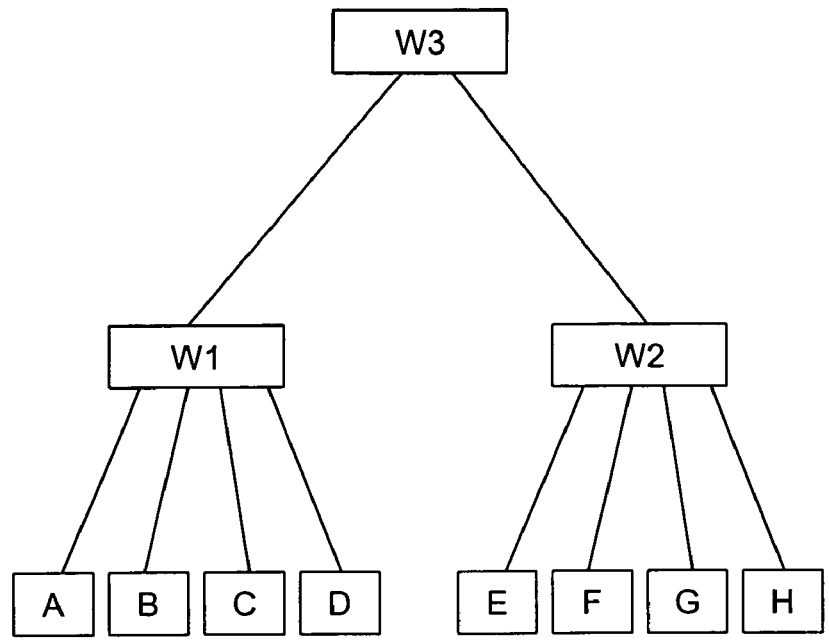
FIG. 5 is an illustration of a pair of groups of leaf nodes in the supercomputer of FIG. 1.
FIGS. 6A and 6B illustrate operations required for the elements of FIG. 5 to complete computing cycles in differing configurations.

Having determined the number of spare computing elements required for a given duration of computing operation, a further aspect of the present embodiment lies in the distribution of spare elements at selected leaf nodes to enable optimum performance to be achieved, and more particularly, the locations at which any spare elements are located. Referring now to FIG. 5 a small part of the overall hierarchy of FIG. 1 is illustrated in more detail: switches W1 and W2, each being a child node of switch W3, each have four leaf nodes populated by computing elements A, B, C, D and E, F, G, H respectively. In this example, two elements of the eight are to be held as spare in the event of a fast comms link failure to any of the other six; in this example these will be elements D and H. Consider now a simplified computing operation which requires four elements, in which each element performs a computation, transmits the result of its computation to another element, which then performs a further computation before transmitting the result of the further computation to yet another element, and so on. The tables of FIG. 6 illustrate the time required for a single cycle, based on an assumption that the ratio of meaningful computational operations (such as a floating point operation) to communications is 1:1. The cycle starts with the performance of a computation by element A, which takes a single time interval, followed by a communication to element B, which, being only a single hop via switch W1, also takes only a single time interval. This is followed by a computation by element B and then subsequent communication to element; and then a computation by element C. Thus far in the cycle the total time taken is 5 time intervals, one for each step of the cycle and if all four elements A, B, C, D were available the total cycles would simply be 8, as illustrated in FIG. 6A.

However, since element D is being retained as a spare, the next step of the cycle is the transmission of data computed at element C to element E. This requires two hops, and thus two time intervals to transmit to element E. Once computation at element E is completed, transmission of the computed data back again to element A once again takes two time intervals. Thus, the total number of time intervals to complete a single cycle is 10, as shown in FIG. 6B. This is two time intervals more than would have been required had element D been available for the computation, since communication to element D from element C, and to element A from element D would have taken a total of two fewer hops. It is thus apparent that the retention of spare elements slows down the computation not only by reducing the total number of available computing elements, but also by requiring, as a consequence, longer communication times. Conversely, had element D been operational, then two of the elements E-H would have been retained as spares, which, depending upon the nature of the computing operation for which the remaining two operational elements in the cluster E-H were commissioned, may impose an even greater time penalty. In addition, if spare computing elements are to be provided, it is desirable to retain such elements at locations within the hierarchy so that once they are brought into commission, the any time penalty required to perform additional communications operations is as small as possible.

These conflicting requirements are optimally balanced in the following manner:

For a particular configuration of spare elements, the expected run time E, $$\simeq (1-P)^N N T_{Na} + P \Sigma_{i=0} (i T_{Na} + (N-i) T_{Ra})$$

Where:

N is the number of computing cycles required;

P is the probability of failure in any given loop (which is uniform)

$T_{Na}$ the time required for a single loop when spare elements are commissioned $T_{Ra}$ is the time after failure Different configurations of spare elements are then modelled using the above expression, and the expected run times are compared to determine the configuration of spares which is most likely to yield the shortest run time.

A characteristic of computing operations performed by a supercomputer is that their consumption of computing power, which can, broadly speaking, be equated to the number of computing elements which are required at any moment during the computation, is rarely uniform over the course of the operation. For example, considering a computing operation which requires 8 cycles, and the use of five computing elements A, B, C, D, E. However, not all of the elements will be required for each of the cycles; the various elements required for each cycle being illustrated in FIG. 7 (signified by the element in question being shown in bold typeface). A further aspect of this embodiment is the appropriation of computing elements as redundant spares for the duration of computing cycles in which they are not required. Thus, during the first and second cycle, elements A, B, D and E are available as spares S; during the third A, D and E, and so on. Preferably, the spares are appropriated in a designated order, so that spares which are scheduled for the lowest level of utility (i.e. in the smallest number of computing cycles) in a given computing operation are appropriate first.

One consequence of appropriating a spare element which is scheduled to perform in subsequent cycles of an operation is that that element is then unavailable for the scheduled cycle, or, alternatively, if the element is then used for its scheduled operation, a delay will ensue on the performance of the tasks on which it had been, up to that time, been operating as a spare. This can be ameliorated in a number of ways. Firstly, depending upon the length of the computing operation and the cycles, it is possible that, by the time the computing operation has reached a cycle in which an element previously appropriated as a spare is scheduled to operate, the broken fast comms link occasioning the appropriation of the spare may have been repaired, so that the operation can then proceed as originally planned. Accordingly spare elements are typically only allocated to perform on a cycle by cycle basis, thus providing an opportunity, in the event for example that a fast communications link has been repaired by the end of a cycle, for the element originally scheduled to perform tasks for which it is subsequently scheduled (for example in the subsequent cycle). This keeps disruption of the scheduled tasks to a minimum.

In a modification of this embodiment (which may be implemented in conjunction with or as an alternative to the previously-described method), one or more of the computing elements are partitioned into two virtual machines. Referring now to FIG. 8, computing element A is partitioned, at the software level, into two virtual, independently operating machines. This is a technique which is known in the art of computing and will not be discussed further, other than to acknowledge that each of the two virtual machines, operating as they do on a single hardware platform, typically have marginally less than half of the capability of a single machine operating on the same platform. Thus, for the duration of the entire computing operation, element A exists as two elements A1 and S1, with S1 being available as a spare element. For the first five cycles, during normal operation (i.e. operation without failure) both these elements remain partitioned by inoperative. In the sixth and seventh cycles, where element A is scheduled to operate, its tasks are performed as element A1, having significantly less computing power than element A, but enabling the provision of a spare element, S1 in the event of a failure.

In yet a further modification, during normal operation without failure, in the sixth and seventh cycles, the spare element S1 can be commissioned to perform some of the operations of element A, so that, in effect the partitioning of element A into two virtual machines results in the partitioning of the tasks scheduled to be performed on that element to match the two machines. In the even that spare element S1 is needed, it's state is transferred to element A1 (which shares the same hardware platform) and S1 then starts to operate as a spare. This doesn't obviate the subsequently slower performance of element A1 on tasks previously scheduled for element A, but minimises what may be thought of as unnecessary delays when spare element S1 would otherwise be idle.

The use of such techniques can be advantageous in circumstances such as, in the case of a time-critical computing operation, for example, one which, as a result of external factors, must be completed by a specified time in order to be of any utility. The partitioning technique provides greater assurance of the completion of a computing operation, albeit at a slower rate. Thus it may be of particular utility to implement such a technique toward the end of a lengthy computing operation (e.g. after a predetermined number of cycles), where, as a result of the volume of data already computed, re-commencing and finishing by the designated time is not possible, and completion of the operation within a short time band of the designated time is of significantly greater utility than not completing the operation at all, or a long time afterwards. Accordingly, the use of such techniques should be considered as being dynamically available, i.e. implementable during the course of a computing operation, rather than solely scheduled at the beginning of one.

What is claimed is:

1. A method of operating a computer system having a plurality of computing elements each connected to a communications link, the method comprising:
    scheduling specified computing elements to perform computing tasks in specified cycles of a computing operation;
    transferring an operational state of a disabled computing element unable to communicate as a result of a fast communications link failure to an idle computing element not scheduled to perform a task in the given cycle; and
    operating the idle computing element to perform any remaining disabled computing element uncompleted tasks scheduled in the cycle.

2. A method according to claim 1, wherein the state is transferred via an other communications link having a higher reliability than the communications link and wherein the other communications link is slower than the communications link.

3. A method according to claim 1, comprising:
    partitioning one or more computing elements to generate virtual computing elements scheduled to be idle during the course of a cycle in which all elements are scheduled to perform computing tasks.

4. A method according to claim 3, wherein partitioning occurs for the duration of a cycle in which all unpartitioned elements are scheduled to perform computing tasks.

5. A method according to claim 3, farther comprising:
    monitoring available idle computing elements, and when a number of available idle computing elements drops below a predetermined threshold, initiating partitioning of a computing element.

6. A method according to claim 3, farther comprising:
    using two or more virtual computing elements on the same computing task for as long as a partitioned computing element is not required to ameliorate failure of a communications link.

7. A memory or a computer-readable medium storing instructions which, when executed by a processor, cause the processor to perform the method of operating a computer system as claimed in claim 1.

8. A computer system for operating a computer system, comprising:
    one or more processors; and
    a memory coupled to said one or more processors, said memory having stored therein sequences of instructions which, when executed by one of said one or more processors, cause one of said one or more processors to perform the method as claimed in claim 1.

9. A processor arrangement configured to perform the method according to claim 1.

* * * * *